United States Patent

Michnik et al.

[15] 3,665,321

[45] May 23, 1972

[54] SYSTEM FOR PASSING ON-FREQUENCY SIGNALS AND FOR GATING-OUT OFF-FREQUENCY SIGNALS

[72] Inventors: Lewis Michnik, Buffalo; William G. Tapply, West Seneca, both of N.Y.

[73] Assignee: Sierra Research Corporation

[22] Filed: July 2, 1969

[21] Appl. No.: 842,799

Related U.S. Application Data

[63] Continuation-in-part of Ser. No. 603,865, Dec. 22, 1966, abandoned.

[52] U.S. Cl. ..............................325/478, 325/323, 325/324, 325/474, 325/476, 325/477, 328/147, 328/148, 328/149, 328/163, 328/167

[51] Int. Cl. ..............................H04b 1/10

[58] Field of Search ..............................325/65, 303, 323, 324, 473, 325/474, 475–479; 328/146–149, 163, 165, 167

[56] References Cited

UNITED STATES PATENTS

| | | | |
|---|---|---|---|
| 3,218,556 | 11/1965 | Chisholm | 325/324 |
| 3,462,691 | 8/1969 | McDonald | 325/477 |
| 3,495,244 | 2/1970 | La Rosa | 325/323 |
| 3,213,450 | 10/1965 | Goor | 325/475 |

*Primary Examiner*—Benedict V. Safourek
*Assistant Examiner*—Albert J. Mayer
*Attorney*—Alexander & Dowell

[57] ABSTRACT

A system for accepting signals of a desired frequency as well as undesired signals of other frequencies together therewith, examining the desired and undesired frequency components with regard to their intensities and using the results thereof to control gating means in the main receiver output path to pass signals whenever the relative levels of desired and undesired signal components fall within a satisfactory range. This determination is made by regulating a composite of both signal components to a constant level, and then comparing the level of a selected one of these components of the regulated composite with a preadjusted reference threshold level to derive a gate control signal.

15 Claims, 8 Drawing Figures

INVENTORS
LEWIS MICHNIK
WILLIAM G. TAPPLY

BY Alexander & Dowell
ATTORNEYS

INVENTORS
LEWIS MICHNIK
BY WILLIAM G. TAPPLY
[signature]
ATTORNEYS

Patented May 23, 1972 3,665,321

3 Sheets-Sheet 3

*INVENTORS*
LEWIS MICHNIK
BY WILLIAM G. TAPPLY
Alexander & Dowell
*ATTORNEYS*

SYSTEM FOR PASSING ON-FREQUENCY SIGNALS AND FOR GATING-OUT OFF-FREQUENCY SIGNALS

CROSS-REFERENCE TO RELATED APPLICATION

This application is a continuation-in-part of application Ser. No. 603,865, filed on Dec. 22, 1966, now abandoned.

The present invention provides a way of increasing selectivity in a tuned signal transferring system to an extent that cannot be accomplished by filtering alone, and has utility when combined with a great variety of different types of signal transferring systems, such as receivers, not only of R.F. energy but also of sonic and supersonic energy, for instance in connection with radar and sonar systems. The present invention can be applied to both superheterodyne and TRF receiver circuits, as well as other general types.

The present invention is somewhat similar to U. S. Pat. No. 3,218,556 issued to Sierra Research Corporation, the common assignee, on an invention by John Chisholm relating to "-Spectrum Centered Receiver Systems."

A frequent type of interference is caused by other similar transmitting equipment operating in relatively close proximity, and involves a spectrum of undesired signals the center of which (if any) is usually, or can be deliberately, offset somewhat from the center of the main passband of the equipment including the signal transferring system in question. The present type of noise elimination is based upon the fact that, in the usual case the frequency spectrum of the desired on-frequency signals will be centered about the system's main passband, but that the spectrum of undesired off-frequency signals will be offset therefrom. Probably the most damaging interference results from radiation arriving directly (as distinguished from reflected energy) from another unit, such as radar or sonar, operating at a slightly different frequency but in close enough proximity to the present system that the selectivity thereof is incapable of eliminating its signal. The local circuits may even compound such undesired signals into other spurious frequencies by crystal detection in its mixer, assuming the case of a receiver of the heterodyne type, which may or may not be the case in a practical situation.

It is the principal object of this invention to provide improved circuitry for analyzing the spectrum of frequencies introduced into the system both within, and adjacent to, its desired passband, such analysis being conducted to the extent of determining the level of off-frequency components lying outside the main passband as compared with the relative level of on-frequency components inside the passband, and then processing the results of this analysis to determine whether the main passband should at that instant be gated on or gated off. The present system has particular utility in connection with pulse systems in which undesired pulse signals falling outside of the main passband are eliminated by gating means in control of the output of the system's main passband.

This invention includes means for regulating the composite signals comprising the desired and undesired components to a constant level, one example of such regulating means taking the form of a regulating amplifier having a large number of stages which will become saturated by the presence of desired and for undesired pulse signals introduced thereinto, thereby producing an output having a substantially constant level for all input signals lying within a wide range of signal levels. This amplifier is used in the present system in combination with filter means for passing one of the said components of the composite regulated signals for the purpose of comparing the momentary level thereof against an adjustable and preset threshold level. Basically, the novelty of this invention resides in the fact that a comparison of desired and undesired energy levels is actually performed in an unusual manner by employing a regulating amplifier to standardize the output level, and then determining the proportion of one or the other of the signal components included therein by comparing it with a fixed reference voltage. If the regulating device is a saturating amplifier, when two signals are introduced into this amplifier, the larger one saturates the amplifier and the smaller one is not passed through it. Thus, when the desired signal level is instantaneously stronger, the regulated constant level output contains mainly the desired component. Conversely, at another instant when the undesired component is stronger the output of the saturating amplifier will consist mainly of the undesired component.

There are a number of different regulating, limiting and/or clipping means, both active and passive, that can serve the present purpose, namely to accept in the system's auxiliary bandpass desired and undesired signals either one at a time or superposed to form a composite, and deliver at their own outputs a signal whose amplitude is maintained constant at all times. As pointed out above, some such means tend to enhance the dominant signal, but others may not do so and may merely deliver to their outputs a fairly faithful reproduction of the input signal but standardized as to amplitude. Either is satisfactory for present purposes so long as the passband of the limiting means is broad as compared with the system's main passband which is tuned to the on-frequency components.

The regulated output is then delivered to an auxiliary passband filter which can be either a notch filter for eliminating the on-frequency components or a pass filter for passing the on-frequency components while substantially eliminating the off-frequency components. In the former case, the output of the auxiliary passband will comprise the off-frequency components of the whole regulated composite signal, and can be used to turn-off a normally conductive gate in the system's main passband. In the latter case, the output of the auxiliary passband will comprise the on-frequency components of the whole regulated composite signal, and can be used to turn-on a normally blocked gate in the system's main passband.

In either case, the output of the filter will be a component whose magnitude is less than the magnitude of the whole regulated composite signal. This output of the filter then has its level compared with the level of an adjustable arbitrarily selected reference level to determine whether the main passband of the system should be gated on or gated off at any particular instant. Suitable adjustment of the reference level will control the threshold at which the system will reject all signal components because of the presence of undesirable off-frequency components.

The present system has particular utility in pulse-echo receivers. It can be used either in the IF system of an heterodyne receiver, in which case the main passband and the auxiliary passband filter will be fixed tuned to the intermediate frequency, or it can be used in the R.F. stage of either heterodyne receiver or a TRF receiver, or in the AF frequency front-end of a sonar receiver. When used in a tunable receiver but not in the latter's IF amplifier, then both the main passband and the auxiliary-passband filter must be tuned and must track each other. Such tuning may be variously accomplished either by mechanical means or by electronic tuning, for instance voltage-controlled tuning using a scan voltage generator.

Other objects and advantages of the invention will become apparent during the following discussion of the drawings, wherein.

Figure 1:
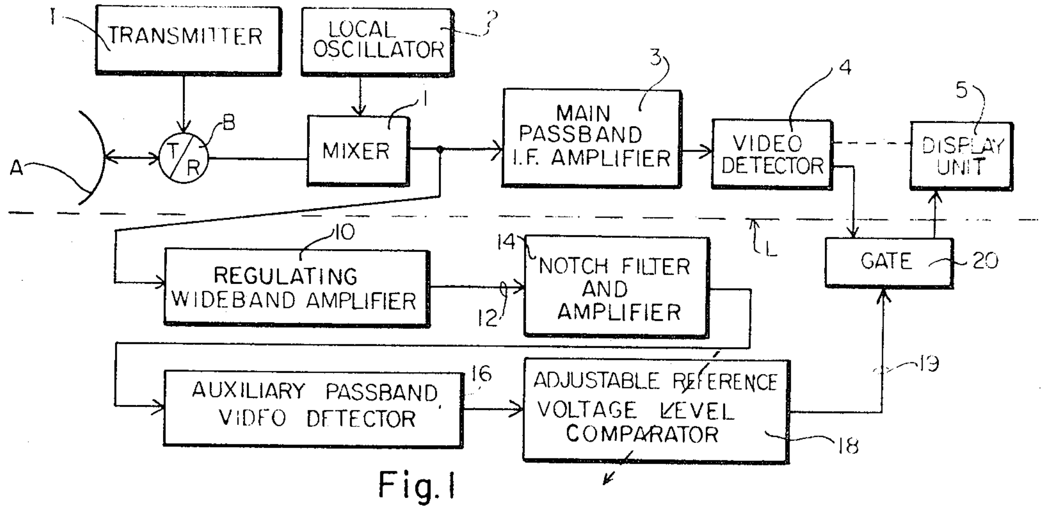
FIG. 1 is a block diagram showing a system embodying the improved novel features of this invention.

Referring now to the drawings, FIG. 1 shows one illustrative embodiment of a signal transferring system of the present type combined in a typical pulse transceiver, such as a radar system or a sonar system, and including transducer means for radiating and receiving pulses, such as the antenna A, connected to duplexer means B which in turn is coupled to a pulse transmitter T and to the input of a receiver including a mixer 1 and a local oscillator 2. In a radar system the mixer and the local oscillator serve to reduce the pulse frequency to an intermediate frequency which can be conveniently handled by a conventional IF amplifier 3, for instance a 30 MHz multiple stage amplifier. On the other hand, in a sonar system the sonic energy applied to the mixer from the transducer A would be elevated in frequency by heterodyning it with the local oscillator 2 in the mixer 1 to provide a suitable IF frequency. The illustrated pulse-echo system also includes a video detector 4 and an appropriate display unit 5. All of the units described so far and appearing above the dashed line L in FIG. 1 are well-known components of conventional pulse-echo systems. The main passband path through the receiving system therefore includes the main passband IF amplifier 3 and the video detector 4.

Figure 2:
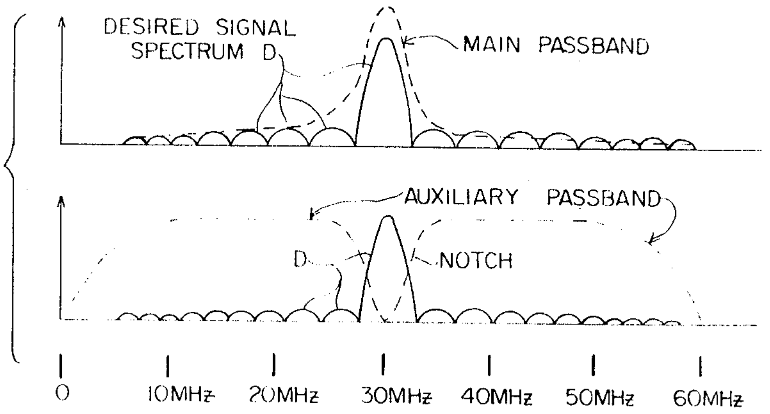
FIGS. 2 and 3 are two graphic diagrams representing, respectively, the case where most of the energy in the spectrum lies within the main passband, and representing the opposite case where most of the energy lies outside of the main passband.
Figure 3:
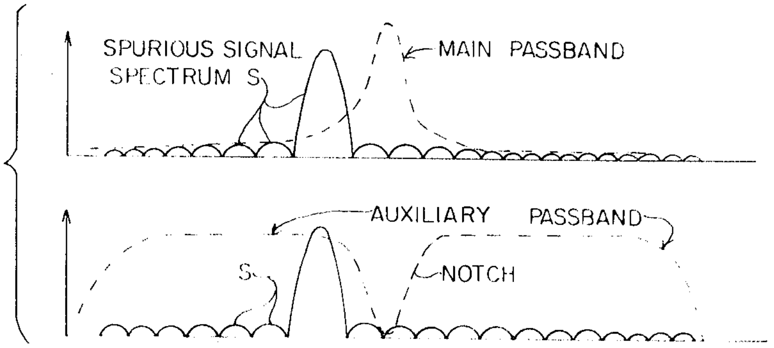

The present invention adds to these well-known components the components appearing beneath the dashed line L IN FIG. 1 and comprising the auxiliary passband path, the illustrated embodiment including a wide band regulating amplifier 10 whose output is regulated to a constant composite level, assuming that the input amplitude to the wideband amplifier 10 is adequate to cause limiting. In practice, this amplifier is a commercially available transistorized unit which is purchased on the open market, and which when taken with the succeeding notch filter 14 has a pass characteristic approximately as shown in FIGS. 2 and 3 at the dashed lines marked "auxiliary passband." It is to be noted that samplings of all of the signal components from the mixer 1 are fed through the regulating amplifier 10 whose output 12 is connected to the notch filter and amplifier 14, which is tuned to pass signals on both sides of the main passband frequency but to reject a narrow band of frequencies co-extensive with the main passband. In the present illustrative embodiment the output of the filter 14 passes through a video detector 16 which then delivers pulses to a comparator 18, the latter being adjustable to provide a DC reference voltage level with which the peak amplitudes of the pulses from the detector 16 are compared. If the peak amplitude of an off-frequency pulse which has passed through the notch filter 14 is greater than the adjusted reference-voltage threshold in the comparator 18, a control voltage appears on the wire 19 to block the normally conductive gate 20, thereby interrupting the output signal from the video detector 4 to the display unit 5. This interruption persists so long as the pulse amplitude from the detector 16 exceeds the adjusted reference voltage level in the comparator 18, but the gate becomes conductive again as soon as the pulse from detector 16 falls below this reference threshold level.

Thus, the receiver is provided with two intermediate frequency paths comprising a main path including the IF amplifier 3, and the video detector 4; and an auxiliary path including the regulating amplifier 10, the notch filter 14, and the video detector 16. The main passband amplifier 3 is tuned to provide a relatively sharp characteristic as shown at the upper dashed line curves appearing in FIGS. 2 and 3, and therefore the video detector 4 receives energy which represents the strength of the component D appearing in the desired passband plus such undesired components as the IF amplifier 3 is unable to reject. Conversely, the video detector 16 in the auxiliary path receives energy which represents the undesired spurious signal components S plus perhaps some energy falling within the desired passband range which the notch filter 14 may be unable to reject.

It will be noted that FIGS. 2 and 3 show two sets of curves each representing the spectrum of input frequencies along the horizontal axes. The vertical axes indicate amplitude of the signals. In each of these graphical figures, the upper set of curves refers to the main passband path and the lower set of curves refers to the auxiliary passband path. Each of the figures includes in dashed lines a curve indicating the passband characteristic of the particular path to which the set of curves refers. Since the upper sets of curves in FIGS. 2 and 3 refer to the main receiver path, its passband characteristic as illustrated in dashed lines comprises a relatively narrow bandwidth, typically covering about four megacycles total. Moreover, it is assumed at all times to be tuned, either automatically, or manually, to the output frequency of the transmitter T.

It is well-known that the output pulse energy from a transmitter, for example a magnetron, comprises a spectrum rather than a single output frequency. In other words, the principal-energy pulse delivered from the magnetron is delivered at a nominal frequency, but the frequency "splash" creates a whole spectrum of other frequencies which amount to a relatively uniformly distributed continuous spectrum extending both up and down from the principal pulse frequency. This spectrum splash is a substantial source of interference in radar systems, especially where there are a plurality of radars operating at somewhat different nominal frequencies in the same general band and within a relatively small area. If the magnetrons in each of the radars could put out nothing but the principal burst of energy for which they are tuned without substantial off-frequency components, then it would be a simpler thing to tune out other radars in the same area so that they would not interfere with each other. However, the magnetron splash cannot be tuned out because it substantially covers the band, and therefore the only way to avoid interference by other radars has been to remove them from geographic proximity so that distance will attenuate the undesired frequency spectra. This is not a practical solution to a problem which exists among plural radars in a single task force, all of which radars must be allowed to operate simultaneously and in such close proximity with other radars as to frequently cause serious mutual interference.

A similar interference situation exists as between plural sonars operating aboard vessels in close proximity to each other, for example, when hunting a submarine. These sonars may operate at different frequencies, but the separation is small and the spectra of the transmitted pulses overlap, so that filters are ineffective in eliminating such interference.

In the present system, as pointed out above, the main passband has a relatively narrow width tuned to receive the precise frequency of the system's own transmitter, as in common practice. The auxiliary passband of the system is tuned in such a manner as to be sensitive to incoming signals at frequencies adjacent to, but displaced from, the frequency transmitted by the unit's own transmitter. Thus, the lower curve, illustrated in both FIGS. 2 and 3 in dashed lines and outlining the band pass characteristic of the auxiliary path, is provided with a broad bandwidth divided by a notch corresponding exactly in frequency with the transmitter frequency of the present system.

FIG. 2 further illustrates the spectrum of desired frequencies D emanating from the system's own transmitter and including maximum energy concentrated within the passband of the main path but having a plurality of components in its spectrum extending out considerably on both sides of the center frequency to which the system is principally responsive. Assuming that this spectrum is transmitted by the system's transmitter T, the returning echoes comprise a similar spectrum of frequencies as indicated at D in FIG. 2. Note that the principal energy content of the echo is squarely centered within the passband of the main path and within the notch between the two spaced auxiliary passbands, the latter being much greater in width than the main passband, and the notch coinciding generally with the main passband and substantially coextensive therewith.

FIG. 3 shows a set of curves similar to those shown in FIG. 2 except that a different spectrum of signal frequencies is introduced into both paths this spectrum representing interference from another system operating within the same band of frequencies but having a transmitter delivering its principal energy components at a frequency which lies outside of the passband of the main path. Therefore, the signal spectrum S is spurious and should be rejected by the present system since it was initiated by a transmitter of a different system.

The main passband is made narrow in order to provide maximum selectivity favoring desirable signals and rejecting undesirable signals. On the other hand, the auxiliary passband is made wide so that it can detect the presence of large noise components even though their frequencies may be quite far removed from the desired passband signals. The reason for providing such a great width for the auxiliary passband resides in the fact that strong transient signals have a tendency to create in the tuned circuits of the mixer unit itself, and in other circuit components, artificially generated frequencies falling near the main passband. In other words, the rapid rise time of a pulse, which itself includes no components near the desired passband, can create such transient components. Such a pulse must therefore be taken into account in the present system in order to provide adequate noise elimination.

The comparison of the proportion of the desirable signal D to the spurious signal S is made simply by selecting in the filter 14 the spurious component S while eliminating the desired component D from the output of the regulating amplifier 10, and then from the video detector 16 with comparing its rectified peak value taken from the detector 16 with an arbitrarily selected and adjusted threshold reference level in the comparator 18. Thus, the present invention provides a very simple way of making a quantitative comparison between the energy in the main passband and the energy in the auxiliary passband.

In a pulse system, in the usual case the receiver at any particular instant is detecting either desired or undesired pulses but not both at the same time, although the latter situation also frequently occurs. If an output level of 10 volts is assumed for the composite signal from the regulating amplifier 10 as a result of the presence of an input signal, and if the signal is mostly a desired "on-frequency" signal, the notch filter will remove for example 80 percent of its energy so that less than five volts will remain at the output of the notch filter 14. If the reference level 18 is adjusted to 5 volts, the comparator will fail to deliver an output on wire 19 sufficient to block the gate, and therefore the signal through the main passband will appear at the display unit 5.

Conversely, if the input to the saturating amplifier 10 is mostly "off-frequency" or undesired, most of the energy from the amplifier 10 will pass through the notch filter 14 and will be more than strong enough to overcome the 5 volt threshold level and cause an output on wire 19 to block the gate 20, and thus prevent the undesired signal from passing through the receiver to the display unit 5. The gate 20 will remain blocked until the undesired component again falls below 5 volts in the comparator 18.

In the case where the regulation is accomplished using a saturating amplifier 10, if both desired and undesired components appear simultaneously, the stronger of the two will saturate the amplifier 10 and thereby render the latter insensitive to pass the weaker component. In the event that the simultaneous signals are of about the same amplitude the operation will then depend upon the amount of undesired signal which is able to arrive at the output of the amplifier 10 and upon whether the consequent output of the notch filter 14 is greater or less than the 5 volt (assumed) reference level.

Figure 4:
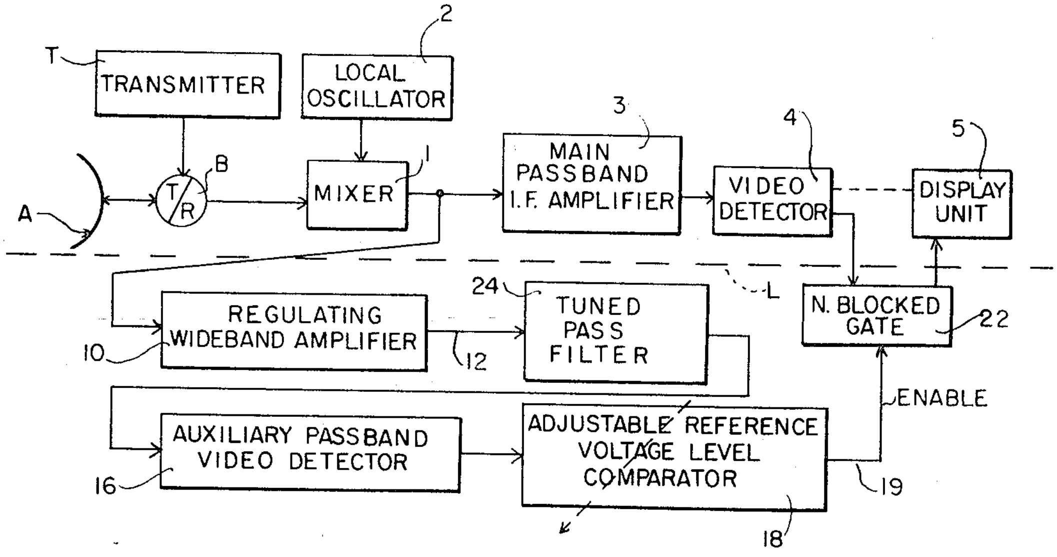
FIG. 4 is a block diagram showing a modified form of the system shown in FIG. 1.

FIG. 4 shows a modification of a system which is basically similar to the one shown in FIG. 1. The environment including the inventive feature as shown in FIG. 4 comprises a radar system including an antenna A and a duplexer B connected with the radar transmitter T and with the receiver mixer 1. The receiver is of the heterodyne variety and has a local oscillator 2 and a main passband IF amplifier 3 followed by a video detector 4 and a display unit 5 of suitable character. The novel features added below the line L include auxiliary passband means comprising a wide broadband regulating amplifier 10 and a tuned pass filter 24 connected to a video detector 16, these units feeding into a comparator 18 having an adjustable reference voltage level. The system interposes a gate 22 between the video detector 4 and the display unit 5. The parts of the system including the amplifier 10 video detector 16 and comparator 18 are substantially the same as in FIG. 1, but the present system differs from the showing of FIG. 1 because the filter 24 and the gate 22 are different.

In connection with FIG. 1 it will be recalled that the gate 20 was normally conductive, and that the comparator 18 normally had no effect on the gate 20. However when the spurious signal components entering the comparator 18 exceeded a certain threshold level, the desired signals having been filtered out by the notch filter 14, an output appeared on the wire 19 to block the gate 20.

Figures 5, 6:
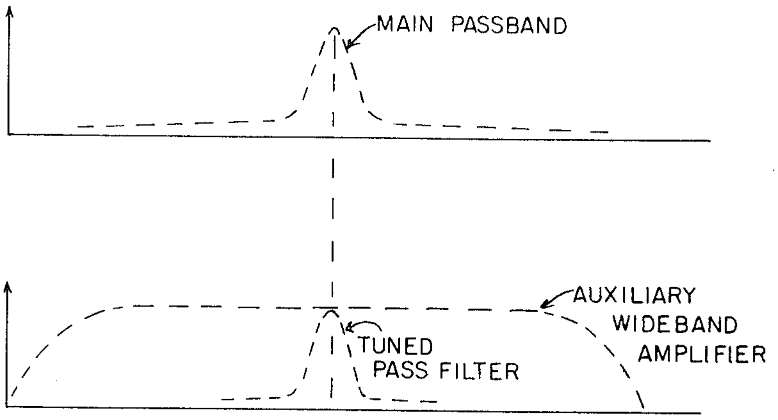
FIGS. 5 and 6 are figures similar to FIGS. 2 and 3, but referring to the FIG. 4 modification.

The modification in FIG. 4 operates just oppositely. The gate 22 is normally blocked, but can be rendered conductive by a suitable enabling signal appearing on the wire 19. In view of the fact that the gate 22 should be conductive only when the desired signal component dominates, the filter 24 in the modification of FIG. 4 is tuned to pass desired signals and to reject undesired or spurious components. Thus, as shown in FIGS. 5 and 6 the main passband has a peak at the desired signal frequency, and the tuned pass filter 24 also has a peak at the same frequency instead of a notch as shown in FIGS. 2 and 3. Thus, the wide band regulating amplifier 10 receives all of the signals, both desired and spurious, and since it has a very wide passband as shown in FIG. 6 it amplifies all of the signals which it accepts from the mixer 1. These signals then reach a standardized level at the output on wire 12, which level remains constant at all times provided sufficient input is applied to the regulating amplifier 10 so that it can regulate its output to said standardized level. The tuned pass filter 24 in FIG. 4 then rejects the undesired component of the regulated composite output appearing on wire 12 and passes the desired component to the detector 16. The detector 16 then puts out pulses whose peak amplitudes are compared with the adjusted reference level in the comparator 18. As stated above, the gate 22 is normally blocked, but whenever the desired component leaving the pass filter 24 and the detector 16 exceeds the adjusted threshold reference level, then an output appears on wire 19 to render the gate 22 conductive and deliver to the display unit 5 the output of the detector 4, so long as the signal persists on wire 19. As soon as the desired-signal level again falls below the threshold level as set by the comparator 18, the gate 22 again becomes blocked so as to prevent spurious signals then present both in the main passband and in the auxiliary passband from being displayed. Thus, the modification of FIG. 4 includes a normally blocked gate 22 which is unblocked whenever the desired component exceeds the threshold level in the comparator 18, and this is the opposite of the manner in which the embodiment shown in FIG. 1 operates.

Figure 7:
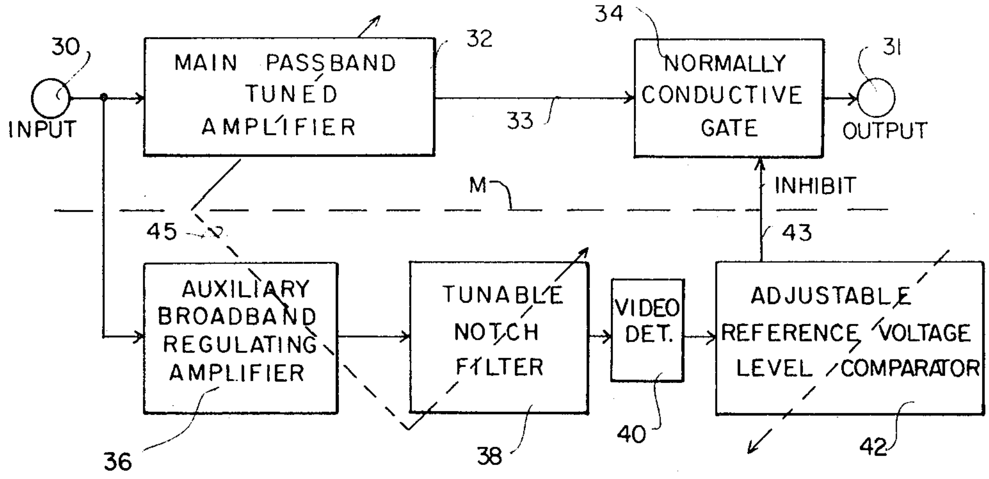
FIG. 7 is a block diagram showing a different embodiment of the invention.
Figure 8:
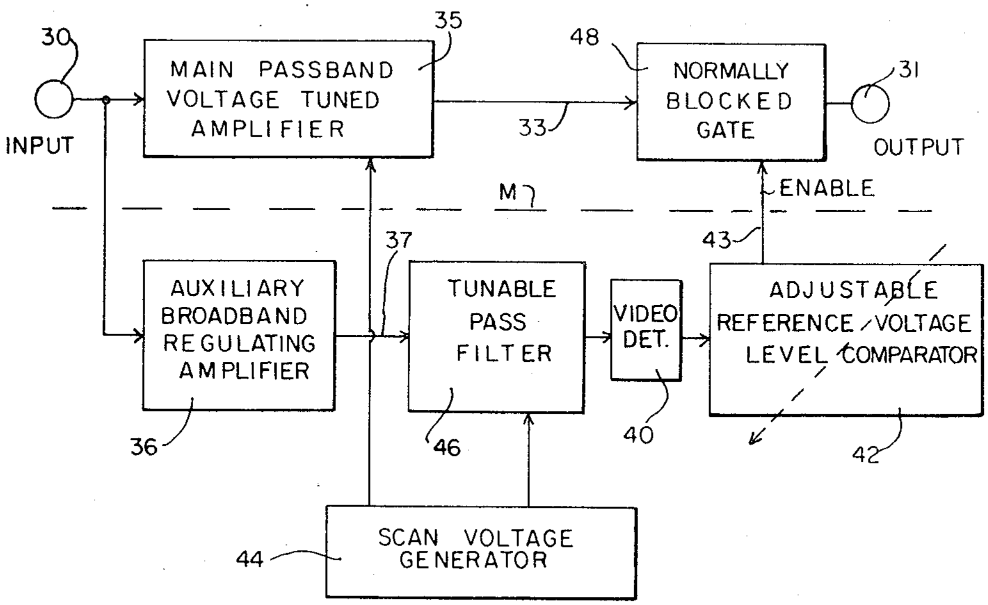
FIG. 8 is a block diagram showing a modified form of the system shown in FIG. 7.

FIGS. 7 and 8 show other embodiments in which the system is not installed in a fixed frequency environment such as the IF amplifier in a heterodyne receiver as was the case in FIGS. 1 and 4, wherein the novel system required no tuning of the main passband or of the filter in the auxiliary passband because of the fact that they always operated at a single frequency, namely the intermediate frequency of the heterodyne receiver. Moreover, the present invention is not necessarily limited to receivers or to heterodyne receivers, but can be applied to any amplifier in the audio, RF, or microwave ranges, and in fact to any range having a tuned frequency at which a system is intended to operate. The modifications shown in FIGS. 7 and 8 are not shown combined with a receiver, but appear useful in any signal transferring system. If the signal being processed occurs at a substantially constant frequency, no tuning problem exists whatever, but this frequently is not the case in a practical unit. Therefore, means has been shown by which the components of the present system may be tuned. These tuning features will be discussed hereinafter.

FIG. 7 shows a system having an input terminal 30 and an output terminal 31. It is assumed that both desired and undesired frequency components are being fed into the input terminal 30 in varying relative proportions with regard to magnitude, and that a main passband amplifier 32 amplifies the desired component and delivers it together with a certain amount of undesired signal via the wire 33 to a normally conductive gate 34, and thence to the output terminal 31. In the auxiliary path appearing below the dashed line M, a broadband regulating amplifier 36 amplifies the mixture of desired and undesired signals introduced at the input terminal 30 and delivers a composite signal of regulated amplitude to the tunable notch filter 38, which then eliminates the portion of the composite signal which represents desired signals and passes the proportion of the regulated composite which represents undesired signals, the latter being detected in the video detector 40, and then delivered to the adjustable reference voltage level comparator 42. The comparator compares the instantaneous peak amplitudes of the undesired signal components from the detector 40 with the adjusted threshold voltage level of the comparator 42, and if the signal peaks exceed the adjusted threshold level the comparator delivers a signal on wire 13 to block the normally conductive gate 34 for the duration of the interval during which the peak amplitude of the undesired component exceeds the threshold voltage level in the comparator 42, thereby blocking the undesired components from reaching the output of the system at the output terminal 31.

Thus, the system of FIG. 7 is similar to FIG. 1 in that its gate is normally conductive, but becomes blocked during intervals when the spurious off-frequency components are excessive. The overall characteristic of the main passband in FIG. 7 resembles the dashed line in FIG. 2, whereas the overall characteristic of the auxiliary passband in FIG. 7, including the regulating amplifier 36 and the notch filter 38, resembles the dashed line contour of FIG. 3.

In a practical installation the output terminal 31 may be connected to the mixer of a heterodyne receiver, or may simply be connected to some other utilization circuit for further processing of the desired signals. For instance, the embodiments shown in FIGS. 7 and 8 may comprise the RF preamplifier of a heterodyne receiver, or may comprise a TRF type of circuit, not limited necessarily to RF operation. In any event, assuming that the input signals include frequency components which are considered desirable by virtue of their frequency, the main passband amplifier will have to be tuned if the system is to be capable of operating at more than one frequency. Moreover, if the tuning of the main passband amplifier is varied, the notch in the filter 38 must also be tuned back and forth to track the momentary frequency to which the main passband amplifier is tuned. One way of accomplishing such tuning is to use an ordinary ganged mechanical linkage shown only schematically in the diagram of FIG. 7 and referred to by the reference character 45.

The modification shown in FIG. 8 is similar to the one shown in FIG. 7 to the extent that the system is illustrated divorced from any intermediate frequency amplifier system, and includes a tunable main passband amplifier 35 and a tunable filter 46 which must track with the main passband amplifier. In another respect the showing in FIG. 8 is somewhat similar to the showing in FIG. 4, to the extent that the gate 48 is normally blocked and is turned on by the presence of a desired signal component having a strength exceeding the threshold level introduced by the adjustable reference level comparator 42. The showing in FIG. 8 includes an input terminal 30, and an output terminal 31, a broadband regulating amplifier 36 and a video detector 40, but in the event that the system is intended to be tunable over a range of desired frequencies, a modified form of tuning is shown replacing the mechanical linkage 45 and comprising a voltage tunable main passband amplifier 35 and a voltage tunable pass filter 46, which are both tuned and tracked by a scan voltage generator 44, this type of circuitry being commercially available and especially well adapted to microwave techniques and appearing often in A.F.C. systems for agile radars.

In the embodiment shown in FIG. 8 the gate 48 is normally blocked, and the auxiliary passband regulating amplifier 36 delivers a composite signal on wire 37 to a tunable pass filter 46 whose passband is coextensive with the main passband of the system, as shown in FIGS. 6 and 5. When the regulated output of the amplifier 36 appears on wire 37, the pass filter 46 will pass those components representing the desired frequency to the detector 40 whose output is then compared to determine whether the peak amplitude of the ladder is greater or less than the reference voltage threshold appearing in the comparator 42. If it is less, no signal appears on the wire 43, but if it is greater the wire 43 becomes energized, and renders the gate 48 conductive to pass signals to the output terminal 31. As is the case in the showing of FIG. 7, the output terminal 31 may be connected either to a subsequent mixer and IF amplifier, or to some other utilization circuit.

It is to be understood that the pass filter 46 or the notch filter 38 may comprise a part of the broadband regulating amplifier 36, or alternatively they may comprise separate units, and that the video detector 40 may or may not include amplification to raise the level of the filtered and detected signal to a range of peak-voltage values which can easily be compared with the adjustable threshold voltage appearing in the comparator 42. These are features of ordinary design and are not believed to involve invention in their selection when making a practical working embodiment.

Having described illustrative embodiments of our invention, we now present the following claims:

1. A system having an input for accepting signals including on-frequency desired type components and off-frequency undesired type components, and said system being operative to pass signals to its output whenever the level of desired components relative to the undesired components is greater than an arbitrarily selected threshold and being operative to block the passage of signals to its output when the relative level is less, comprising:

a. Main passband means coupled to said input and tuned to pass signals including said on-frequency components;

b. Gate means connecting said main passband means to said output;

c. Auxiliary passband means coupled to said input to accept said desired and undesired components and including means operative to regulate said accepted components and deliver to its own output composite signals whose magnitude is constant, and said auxiliary passband means further including filter means connected to accept said regulated output composite signals, to distinguish between desired-type and undesired-type frequency components and to pass one selected type of said components while blocking the other type of said components; and d. Reference level comparison means connected to the auxiliary passband means to receive said selected type components, said comparison means having means for establishing a reference level representing said arbitrary threshold and having means for comparing the level of the selected components with the reference level, and the comparison means having output control signals dependent upon the comparison of these levels and coupled to control said gate means to pass signals when the level of desired components relative to the undesired components as determined by said comparison is greater than said threshold and to block signals when the relative level is less.

2. In a system as set forth in claim 1, said auxiliary passband including high gain amplifier means, and said regulating means together with said amplifier means having a composite passband which is very broad as compared with the main passband means.

3. In a system as set forth in claim 1, said filter means in the auxiliary passband comprising a notch filter tuned to reject on-frequency components whereby the output of the auxiliary passband means comprises the off-frequency component of the regulated composite signal, and said comparison means comparing the level of said off-frequency component with said reference level to obtain a control signal to block said gate means when the former exceeds the latter.

4. In a system as set forth in claim 1, said filter means in the auxiliary passband comprising a pass filter tuned to pass on-frequency components whereby the output of the auxiliary passband means comprises the on-frequency component of the regulated composite signal, and said comparison means comparing the level of said on-frequency components with said reference level to obtain a control signal to render said gate means conductive when the former exceeds the latter.

5. In a system as set forth in claim 1, said system comprising a heterodyne receiver having frequency converter means and intermediate-frequency amplifier means, and said main passband means and auxiliary passband means being coupled in the receiver to accept output from the converter means, said on-frequency comprising the receiver intermediate frequency.

6. In a system as set forth in claim 1, said system being tunable to accept and pass any frequency within a band of selected on-frequencies and to reject off-frequencies having main energy spectra displaced from the selected on-frequency, and said system including means for tuning the main passband means to said selected on-frequency and means for tuning the filter means in the auxiliary passband means to track therewith.

7. In a system as set forth in claim 6, said main passband means and said filter means being voltage tunable circuits, and said tuning means including a scan-voltage generator coupled thereto.

8. A system for receiving desired signals whose energy spectrum peaks up within a tuned passband and for rejecting spurious signals whose spectrum lacks an energy peak therewithin, comprising:

a. Means for receiving a composite of both desired and spurious signal components, and including main passband means to accept and pass desired components of said signals;

b. Gate means connecting said main passband means to an output of the system;

c. Auxiliary passband means connected to said receiving means to receive said composite signals, and including automatic amplifier means for regulating its own output to a constant level upon receipt of a signal, and further including filter means tuned to accept said regulated output level and pass only spurious components of said output level; and d. Reference level comparison means having means for establishing a reference threshold level, and the comparison means being connected to said auxiliary means to receive said spurious components and compare their instantaneous levels with said threshold level, and having means responsive to the relative level of said spurious components as compared with said threshold level and operative to block said gate whenever the spurious component level exceeds said threshold level and to unblock the gate whenever the latter exceeds the former.

9. In a system as set forth in claim 8, said automatic amplifier means having plural stages at least some of which are saturated by received signals having amplitudes above the minimum level for which the system is operative.

10. In a system as set forth in claim 8, said automatic amplifier means having automatic gain control means for adjusting the instantaneous level of the received signals to a constant value.

11. In a system as set forth in claim 8 for receiving pulses comprising bursts of high frequency energy, said automatic amplifier means having a time constant which is short as compared with the rise time of a pulse within the composite frequency range passed by the system.

12. In a system as set forth in claim 8, said receiving means including a mixer and local oscillator for changing the input signal frequencies to an intermediate frequency, and said auxiliary passband means operating upon said intermediate frequency and adjusting the instantaneous peak level of the signal components to be substantially constant, the main passband means and the auxiliary passband means including means respectively tuned to pass the desired signal and to pass a broad range of frequencies on both sides of but excluding the desired frequency; a main detector connected to the main passband means and to the gate; and an auxiliary detector connected to the auxiliary passband means and to the comparison means.

13. In a system as set forth in claim 12, said auxiliary passband means including a broad band filter whose bandwidth on each side of the main passband filter is very broad as compared with the bandwidth of the latter, and said broad band filter having a notch which is substantially co-extensive with the bandwidth of the main passband filter.

14. In a system as set forth in claim 8, said adjustable reference level in the comparison means comprising means for establishing an adjustable DC level which is less than the peak level to which said regulating means adjusts its output signal level, and means for comparing the instantaneous peak voltage of the spurious component with said DC level.

15. The method of receiving and passing to an output desired signal components of one frequency and blocking spurious components of other frequencies which are also received therewith including the steps of:

a. Taking a portion of the received composite components and adjusting the level of said portion of the components to a standardized value;

b. Substantially separating said adjusted components;

c. Comparing the level of one of the separated components with a preselected reference level whose magnitude represents a certain proportion of said standardized value to determine the ratio of said components; and d. Blocking the passage of said components to the output whenever the ratio of desired components to spurious components falls below said certain proportion and enabling the passage of said components to the output whenever said ratio is above said certain proportion.

* * * * *